US012649567B2

(12) United States Patent (10) Patent No.: US 12,649,567 B2
Perez-Duarte et al. (45) Date of Patent: Jun. 9, 2026

(54) AIRCRAFT FLIGHT COMPENSATOR

(71) Applicant: Safran Electronics & Defense, Paris (FR)

(72) Inventors: Alexis Perez-Duarte, Moissy-Cramayel (FR); Fabien Dugail, Moissy-Cramayel (FR)

(73) Assignee: Safran Electronics & Defense, Paris (FR)

( * ) Notice: Subject to any disclaimer, the term of this patent is extended or adjusted under 35 U.S.C. 154(b) by 263 days.

(21) Appl. No.: 18/570,563

(22) PCT Filed: Jun. 15, 2022

(86) PCT No.: PCT/FR2022/051165
§ 371 (c)(1),
(2) Date: Dec. 14, 2023

(87) PCT Pub. No.: WO2022/263777
PCT Pub. Date: Dec. 22, 2022

(65) Prior Publication Data
US 2024/0286738 A1 Aug. 29, 2024

(30) Foreign Application Priority Data
Jun. 18, 2021 (FR) ........................................ 210674

(51) Int. Cl.
*B64C 13/50* (2006.01)
*B64C 13/04* (2006.01)
*G05G 5/03* (2008.04)
(52) U.S. Cl.
CPC ........ *B64C 13/507* (2018.01); *B64C 13/0427* (2018.01); *G05G 5/03* (2013.01)

(58) Field of Classification Search
CPC ..... B64C 27/57; B64C 27/68; B64C 13/0427; B64C 13/507; B64C 13/0421; B64C 13/22; G05G 5/03
See application file for complete search history.

(56) References Cited

U.S. PATENT DOCUMENTS

| | | | |
|---|---|---|---|
| 6,325,331 B1 | 12/2001 | Mckeown | |
| 7,044,024 B1 | 5/2006 | Younkin | |
| 2019/0161180 A1* | 5/2019 | Covington | ............... G05G 5/03 |

FOREIGN PATENT DOCUMENTS

| | | |
|---|---|---|
| EP | 2626297 A1 | 8/2013 |
| FR | 2667044 A1 | 3/1992 |
| FR | 2718102 A1 | 10/1995 |
| FR | 2970697 A1 | 7/2012 |

OTHER PUBLICATIONS

International Patent Application No. PCT/FR2022/051165, International Search Report, Translation of International Search Report, and Written Opinion, dated Sep. 14, 2022.

* cited by examiner

*Primary Examiner* — Said Bouziane
(74) *Attorney, Agent, or Firm* — Kilpatrick Townsend & Stockton LLP

(57) ABSTRACT

This aircraft flight trim system comprises a friction module that has variable friction and is coupled on one side to a drive shaft and on the other side to an output shaft via a kinematic chain.

The aircraft flight trim system has a control circuit which controls the friction module on the basis of an angular displacement value of the output shaft provided by a position sensor and on the basis of a force feedback control signal provided by a flight control computer.

10 Claims, 2 Drawing Sheets

[Fig. 1]
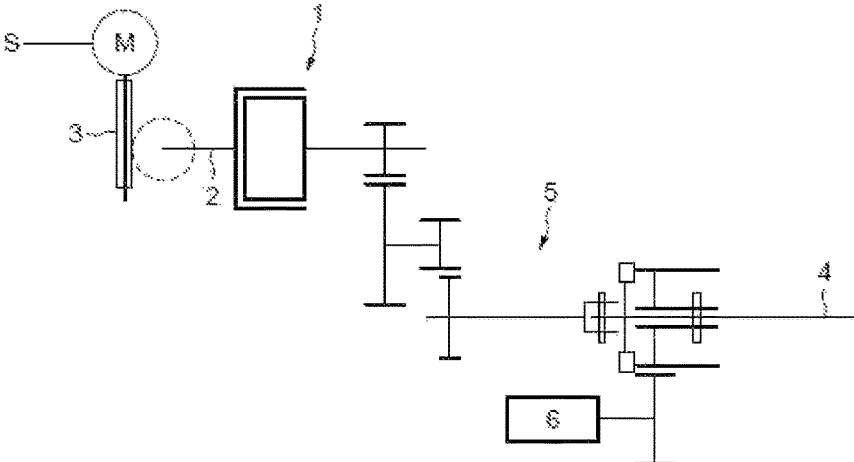
[Fig. 2]
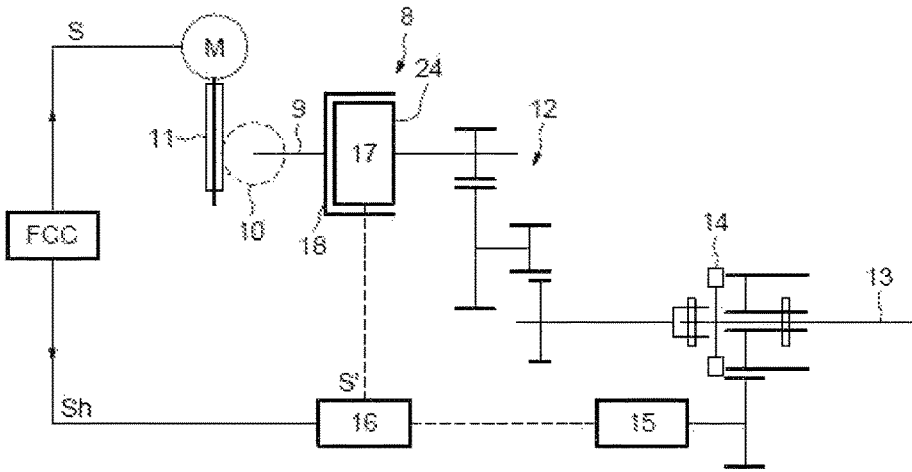
[Fig. 3]
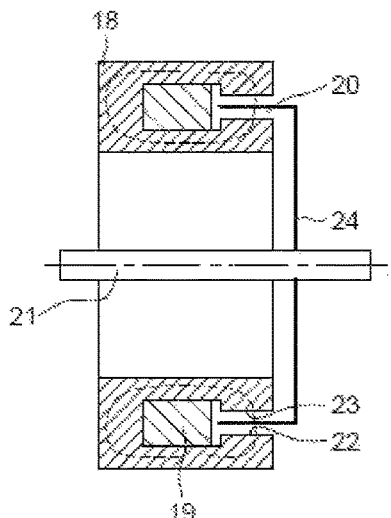

[Fig. 4]
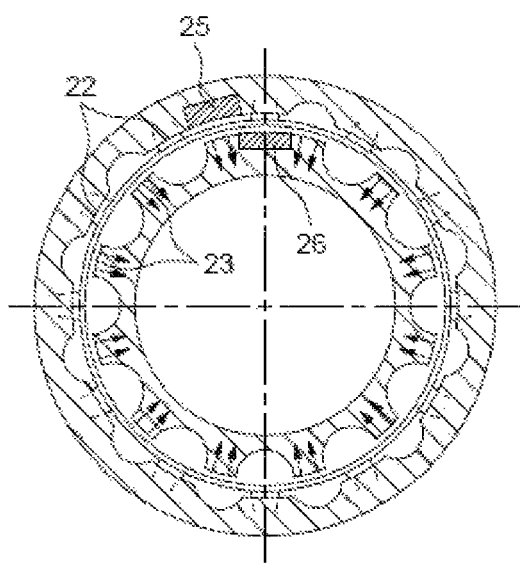
[Fig. 5]
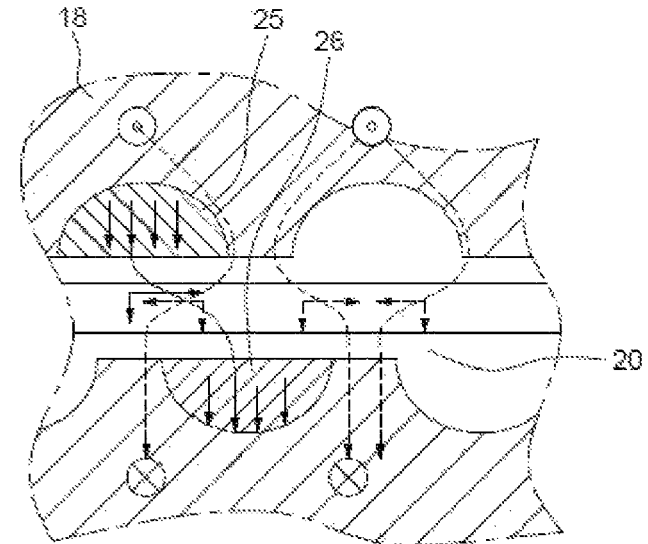

AIRCRAFT FLIGHT COMPENSATOR

The present invention relates generally to aircraft flight control systems and more specifically to an aircraft flight trim system, in particular for helicopters.

One of the functions of flight trim systems is in particular to compensate for disturbances likely to affect the aircraft's flight parameters, without the pilot having to operate the flight controls.

In addition, trim actuators typically provide the pilot with a resistive force on the flight controls in the form of force feedback. This force is generally passive, either linear (spring trimmers) or constant (friction trimmers).

Trim actuators providing a passive friction-type force are designed to provide a constant force whatever the position of the flight control and have a specific setting for each flight control, in particular for roll, yaw, pitch, etc.

When you want to change the force feedback, you need to reconfigure the equipment settings by changing the settings or components.

For trim actuators providing an active friction force, the friction level is independent of the position of the flight control instrument.

In light of the above, the object of the invention is to propose a flight trim system that is able to overcome these drawbacks and in particular to provide controlled variable friction, in particular as a function of the machine, the control axis or in real time as a function of flight conditions.

According to a first aspect, the object of the invention is therefore an aircraft flight trim system, comprising a friction module that has variable friction and is coupled on one side to a motor and on the other side to an output shaft via a kinematic chain.

This flight trim system has a control circuit which controls the friction module on the basis of an angular displacement value of the output shaft provided by a position sensor and on the basis of a force feedback control signal provided by a flight control computer.

In other words, the flight control computer implements a servo loop to define the friction level using an angular displacement value of the output shaft.

In this way, it is possible to produce a force that is developed from a control law conditioned by parameters of the flight computer and from the measurement of the movement of the control stick, i.e. the flight control manipulated by the pilot.

According to another characteristic, the friction module that has variable friction comprises a variable friction torque magnetic brake coupled between the drive shaft and the kinematic chain.

For example, the magnetic brake is connected to the drive shaft by an irreversible reduction gear.

This flight trim system has in particular a drive motor of the drive shaft controlled by a control signal provided by the flight control computer.

In one embodiment, the variable friction magnetic brake has, for example, a first rotor connected to the drive shaft and fitted with a control coil and a second rotor movably mounted opposite poles of the first rotor, the first rotor comprising a magnet placed opposite the second rotor and having sufficient power to generate locally in the second rotor an induction level substantially equal to a maximum induction level generated by the coil when the latter is energized.

For example, the second rotor is ring-shaped and is received so as to pivot about its central axis in a circular groove of the first rotor, the groove having sides with reliefs forming the poles of the first rotor, the brake comprising at least one magnet mounted on the sides of the groove.

In one embodiment, the control system comprises two magnets each mounted on the sides of the groove.

It can be provided that the magnets are positioned substantially opposite each other.

Advantageously, the magnet is mounted between two poles of the stator.

Another object of the invention is an aircraft, in particular a helicopter, comprising a control system as defined above.

Other aims, characteristics and advantages of the invention will become apparent upon reading the following description, provided purely by way of example and in a non-limiting manner, with reference to the appended drawings in which:

FIG. 1 schematically shows the architecture of a conventional flight trim system, FIG. 2 schematically shows the architecture of a flight trim system according to the invention, FIG. 3 is a schematic cross-sectional view of a magnetic brake of a flight trim system according to the invention, in a plane containing the axis of rotation of the brake;

FIG. 4 is a cross-sectional view of the brake from FIG. 3; and

FIG. 5 is a larger-scale view of details of the positions of the first and second rotors in relation to each other.

Reference will first of all be made to FIG. 1, which shows the general architecture of a flight trim system for a helicopter according to the prior art.

As shown, this flight trim system essentially comprises a passive friction brake 1 comprising an input shaft 2, connected by an irreversible reduction gear to the drive shaft 3 of a motor M controlled by a control signal S, and connected to an output shaft 4 by a kinematic chain 5 fitted here with a sensor 6 for measuring the angular position of the output shaft.

As indicated above, this type of friction flight trim system provides a constant force feedback which always opposes the movement of the flight control instrument and which is specific to a given item of equipment such that it is necessary to reconfigure the settings of the trim system, and in particular the passive brake 1, when you want to modify the torque level.

FIG. 2 shows the architecture of a controlled flight trim system according to the invention.

This flight trim system has a friction module 8 providing a variable friction level having an input shaft 9 coupled by an irreversible reduction gear 10, for example a worm gear, to a drive shaft 11 driven in rotation by an electric motor M controlled by a control signal S and a kinematic chain 12 coupled between the friction module 8 and an output shaft 13 itself coupled, for example by a system of connecting rods, to the control stick (not shown) directly manipulated by the pilot.

The kinematic chain conventionally has a gear system as well as limit stops, such as 14, and is also fitted with a sensor 15 for measuring the angular position of the output shaft 13.

The flight trim system also has a control circuit comprising an electronic board 16 receiving the angular displacement values of the output shaft provided by the sensor 15 and supplying a command S' to the friction module 10 that has variable friction.

The control system is furthermore connected to the flight control computer FCC which provides a haptic control signal Sh to the electronic board 16 and the control signal of the motor S.

The friction module 8 is controlled by the electronic board 16 under the control of the flight control computer FCC so as to produce a variable friction force as a function of the position of the flight control instrument manipulated by the pilot and as a function of the flight conditions, for example by modifying the friction torque value provided by the trim system as a function of the angular position of the flight control and as a function of flight phases.

In this respect, the flight control computer FCC implements a servo loop to define the friction level based on an angular displacement value of the output shaft provided by the sensor 15.

In addition, the force returned to the flight control instrument is conditioned by a control law, stored in the flight computer FCC and conditioned by the settings of the flight computer and as a function of the position of the control instrument and its kinematics.

FIG. 3 shows an exemplary variable friction actuator 10.

This actuator comprises a magnetic brake 17 which is coupled to the shaft 9 and to the kinematic chain 12. This magnetic brake has a first rotor 18 fitted with at least one control coil 19. This first rotor 18 comprises a frame in which a circular groove 20 with a central axis 21 is formed. The groove has an outer side and an inner side which respectively have reliefs forming poles 22 and 23. The poles 22 are angularly offset from the poles 23 so that each pole 22 faces the space extending between two adjacent poles 23.

The control coil 19 has a diameter close to that of the groove 20 and is mounted in the first rotor 2 coaxially with the groove in such a way that, when the control coil 19 is subjected to an excitation current, it generates magnetic fluxes passing from the poles 22 to the poles 23, or vice versa, crossing the groove 20 in a non-radial direction. The control coil 19 is connected to the electronic board 16.

The magnetic brake also comprises a ring-shaped second rotor 24 that is received in the groove 20 so as to pivot about the axis 21.

The second rotor 24 is made of ferromagnetic material and is connected to the kinematic chain 12.

When the control coil 19 is subjected to an excitation current, it generates magnetic fluxes passing from the poles 22 to the poles 23, or vice versa, crossing the groove 20 and thus the second rotor 24 in which these fluxes induce local magnetic fields. Thus, in the second rotor 24, each flux has a direction of travel with a radial component and a circumferential component. If the excitation is suddenly cut off while the rotor is stationary, a remanent field is created locally in the second rotor 24 at each point where a magnetic flux has circulated and has a direction identical to that of the flux.

The brake also comprises at least one magnet mounted on the first rotor 18 opposite the second rotor 24 and having sufficient power to generate locally in the second rotor 24 an induction level substantially equal to a maximum induction level generated by the coil when the latter is energized.

More specifically, the brake comprises a magnet 25 (FIGS. 4 and 5) fixed between two adjacent poles 22 and a magnet 26 fixed between two poles 23, one of which is located opposite the magnet 25.

The magnets are positioned substantially opposite each other, notwithstanding an angular offset corresponding to the angular offset between the poles 22 and 23.

The magnets are polarized so as to generate a radial magnetic flux which crosses the second rotor 24 in a direction having a radial component and a circumferential component just like the flux generated by the control coil 19 when it crosses the second rotor 24 at the same point.

As shown in FIG. 5, the flux generated by the magnets will ensure that the local magnetic fields that have been created in the second rotor 24 are all oriented in the same direction, thus eliminating the cogging effect.

It should be noted that the brake can comprise a single magnet or, conversely, several magnets, for example distributed around the groove 20.

The invention claimed is:

1. An aircraft flight trim system, comprising a friction module that has variable friction and is coupled on one side to a drive shaft and on the other side to an output shaft via a kinematic chain, characterized in that the aircraft flight trim system further comprises a control circuit which controls the friction module on the basis of an angular displacement value of the output shaft provided by a position sensor and on the basis of a force feedback control signal provided by a flight control computer.

2. The aircraft flight trim system according to claim 1, wherein the friction module that has variable friction comprises a variable friction torque magnetic brake coupled between the drive shaft and the kinematic chain.

3. The aircraft flight trim system according to claim 2, wherein the magnetic brake is connected to the drive shaft by an irreversible reduction gear.

4. The aircraft flight trim system according to claim 2, wherein the variable friction magnetic brake comprises a first rotor connected to the drive shaft and fitted with a control coil and a second rotor movably mounted opposite poles of the first rotor, the first rotor comprising a magnet placed opposite the second rotor and having sufficient power to generate locally in the second rotor an induction level substantially equal to a maximum induction level generated by the coil when the latter is energized.

5. The aircraft flight trim system according to claim 4, wherein the second rotor is ring-shaped and is received so as to pivot about its central axis in a circular groove of the first rotor, the groove having sides with reliefs forming the poles of the first rotor, the brake comprising at least one magnet mounted in the sides of the groove.

6. The aircraft flight trim system according to claim 5, further comprising two magnets each mounted on the sides of the groove.

7. The aircraft flight trim system according to claim 6, wherein the magnets are positioned substantially opposite each other.

8. The aircraft flight trim system according to claim 4, wherein the magnet is mounted between two poles of a stator.

9. The aircraft flight trim system according to claim 1, further comprising a drive motor of the drive shaft controlled by a control signal provided by the flight control computer.

10. An aircraft comprising the aircraft flight trim system according to claim 1.

* * * * *